(12) United States Patent
Rothman et al.

(10) Patent No.: US 7,739,527 B2
(45) Date of Patent: Jun. 15, 2010

(54) SYSTEM AND METHOD TO ENABLE PROCESSOR MANAGEMENT POLICY IN A MULTI-PROCESSOR ENVIRONMENT

(75) Inventors: Michael A. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 1118 days.

(21) Appl. No.: 10/917,164

(22) Filed: Aug. 11, 2004

(65) Prior Publication Data

US 2006/0036878 A1 Feb. 16, 2006

(51) Int. Cl.
G06F 1/00 (2006.01)
G06F 1/26 (2006.01)
G06F 1/32 (2006.01)
(52) U.S. Cl. .................. 713/320; 713/300; 713/322; 713/324
(58) Field of Classification Search ............ 713/320, 713/300, 322, 324
See application file for complete search history.

(56) References Cited

U.S. PATENT DOCUMENTS

| | | | | |
|---|---|---|---|---|
| 5,283,897 A | * | 2/1994 | Georgiadis et al. | 718/105 |
| 5,307,495 A | * | 4/1994 | Seino et al. | 718/106 |
| 5,737,615 A | * | 4/1998 | Tetrick | 713/324 |
| 5,913,068 A | * | 6/1999 | Matoba | 713/322 |
| 6,075,938 A | * | 6/2000 | Bugnion et al. | 703/27 |
| 6,141,762 A | * | 10/2000 | Nicol et al. | 713/300 |
| 6,718,475 B2 | * | 4/2004 | Cai | 713/323 |
| 6,745,335 B1 | * | 6/2004 | Kusano | 713/324 |
| 6,901,522 B2 | * | 5/2005 | Buch | 713/320 |
| 6,978,389 B2 | * | 12/2005 | Jahnke | 713/322 |
| 7,093,147 B2 | * | 8/2006 | Farkas et al. | 713/320 |
| 2003/0115495 A1 | * | 6/2003 | Rawson, III | 713/324 |
| 2005/0149940 A1 | * | 7/2005 | Calinescu et al. | 718/104 |
| 2005/0155032 A1 | * | 7/2005 | Schantz | 718/100 |
| 2005/0210472 A1 | * | 9/2005 | Accapadi et al. | 718/105 |
| 2006/0123421 A1 | * | 6/2006 | Loboz | 718/105 |

* cited by examiner

*Primary Examiner*—Thomas Lee
*Assistant Examiner*—Ji H Bae
(74) *Attorney, Agent, or Firm*—Joni D. Stutman-Horn (57) ABSTRACT

In some embodiments, the invention involves off-loading processor workloads to reduce power requirements of a multi-processor system. In one embodiment, a multi-processor system redistributes computing among the multiple processors and changes the state of one or more processors to sleep mode. In another embodiment, a multi-processor system throttles the processor speed of under-utilized processors to reduce power consumption. Other embodiments are described and claimed.

29 Claims, 4 Drawing Sheets

SYSTEM AND METHOD TO ENABLE PROCESSOR MANAGEMENT POLICY IN A MULTI-PROCESSOR ENVIRONMENT

FIELD OF THE INVENTION

An embodiment of the present invention relates generally to multi-processor computing environments and, more specifically, to managing workloads among various multiple processors in the system to control power consumption.

BACKGROUND INFORMATION

As higher density computing has come to the forefront, i.e., using more processors and more logical devices per square foot of lab space, organizations with large computing environments need more compute density. However, more computational density requires more power. There has been some attempt to perform power utilization solutions in existing personal computer systems, for instance, by implementation of power-saving stand-by mode which is a software directed/enabled capability. Existing solutions such as this technique may not be viable with respect to servers or high density computing. In a server lab with many computers, the power savings from shutting down one monitor is small compared to the power demands of the entire lab. Further, servers need to be up and running and available all of the time. When the computing environment consumes more energy, more heat is also produced, which requires more air conditioning. To make matters worse, some labs or buildings are limited in how much more air conditioning can be provided.

BRIEF DESCRIPTION OF THE DRAWINGS

The features and advantages of the present invention will become apparent from the following detailed description of the present invention in which.

DETAILED DESCRIPTION

An embodiment of the invention off-loads processor workloads to reduce power requirements of an enterprise system. In one embodiment, a multi-processor system redistributes computing loads among the multiple processors and changes the state of one or more processors to sleep mode. In another embodiment, a multi-processor system throttles the processor speed of under-utilized processors to reduce power consumption.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

An embodiment of the invention provides the ability to off-load processor workloads so that the average processor utilization for any active processor is less than a processor threshold. By off-loading processor workloads within configured tolerances, one can achieve a significant power consumption savings. This can be more appreciated in an environment where high density computing is used.

Figure 1:
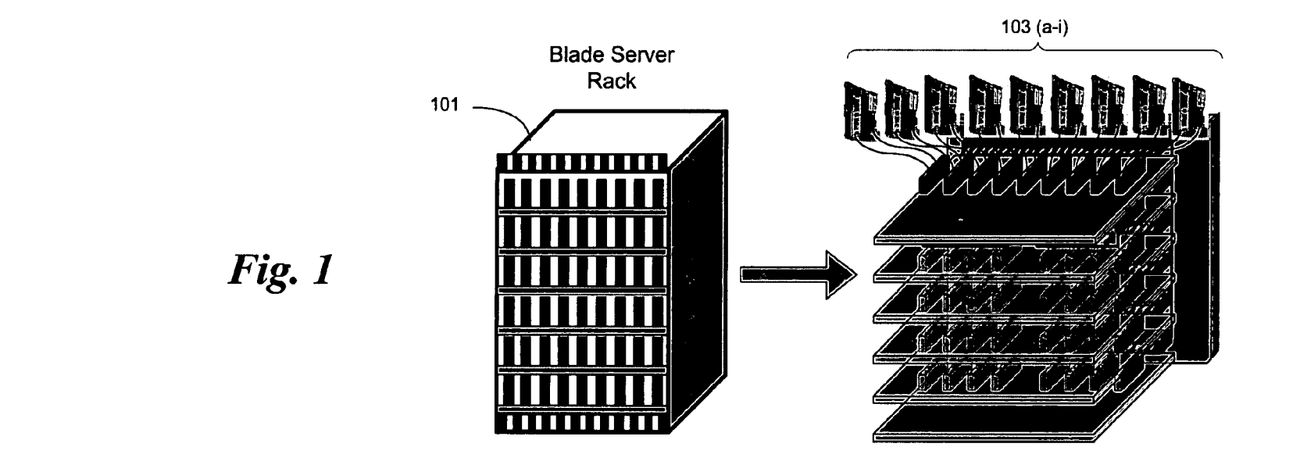
FIG. 1 is a block diagram showing a blade server rack with multiple processors.

FIG. 1 shows a blade server rack 101 having multiple processors. There may be many processors 103 mounted into slots on each rack. A server environment may utilize one or even hundreds of blade server racks to provide the necessary compute capacity for the needs of the environment. A data center, lab, or server room may contain few or many blade server racks, or other multi-processor configurations.

Figure 2:
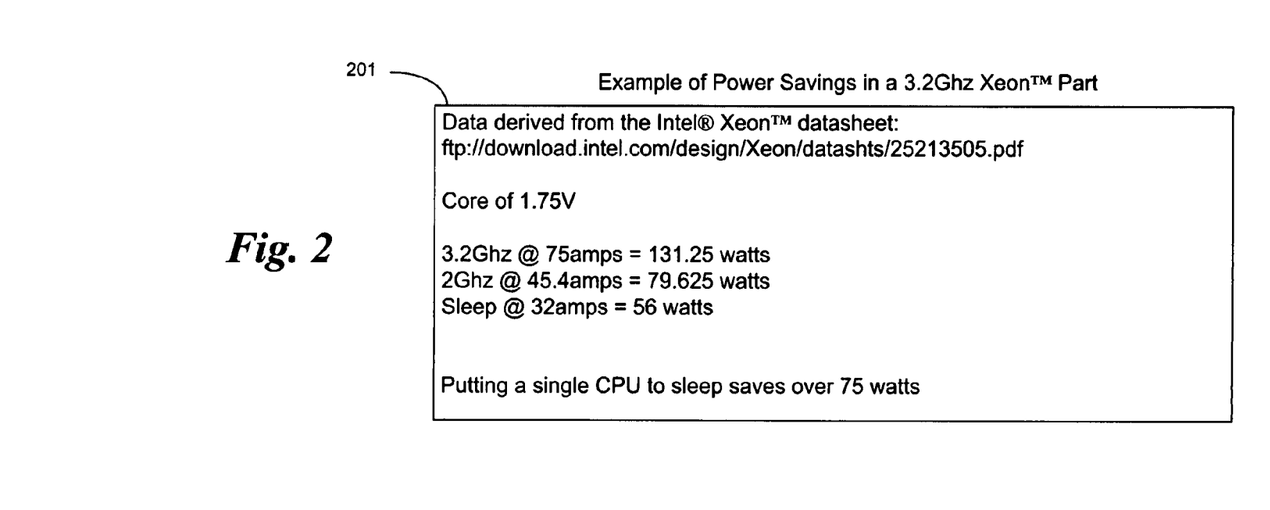
FIG. 2 shows an example of power savings in a 3.2 Ghz Intel® Xeon™ processor, according to an embodiment of the invention.

There are known mechanisms by which existing processors are able to be put into sleep mode. Sleep state standards are typically described in commercially available processor data sheets. In some implementations, the use case may not support sleep, but the specification of the processor allows sleeping. For instance, Intel® Xeon™ processors are typically used in servers, but still have the capability to be put into sleep mode. FIG. 2 illustrates an example power usage chart 201 for a typical server processor. In this example, the data sheet is shown for an Intel® Xeon™ processor, which requires 56 Watts in sleep mode, but 131.25 Watts when running at 3.2 Ghz. Thus, changing the state of a Xeon™ processor running at 3.2 GHz to sleep state saves approximately 75 Watts. However, in existing systems, many uses of this processor do not allow for sleeping.

An embodiment of the present invention makes it practical for a processor to sleep that would normally be required to stay up and running. In one embodiment, setting the processor to sleep mode is similar to hot-removing the processor from the system. Frequently, in operation, most systems processors are not running at 100% utilization. Often the processors are I/O bound. Unless a processor is performing a task that is highly compute-bound, the processor may run at a low utilization rate. For instance, an Internet search facility such as Google™ may have thousands of machines that support the search engine. The primary goal of these thousands of processors is to cache interesting pieces of data and use an intelligent algorithm to parse a user's request to search for an item, and then provide the information to the user in an efficient fashion. A search engine server may be operating at maximum capacity with regard to its ability to service requests, but this is often due to I/O limitations and the processor is not typically at its computational limit.

Figure 3:
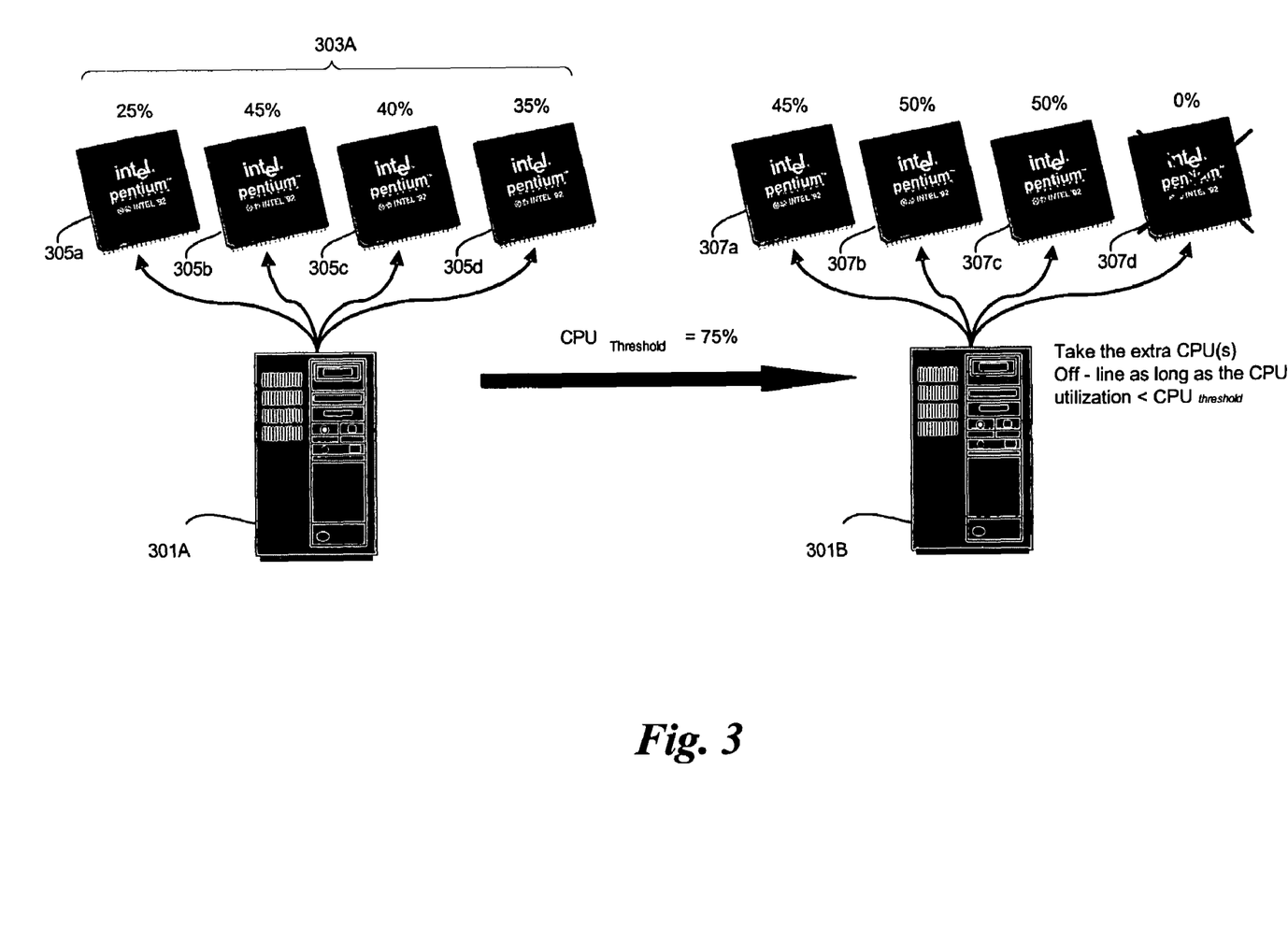
FIG. 3 illustrates a redistribution of computing loads among multiple processors, according to an embodiment of the invention.

Referring to FIG. 3, while many highly dense computing environments have hundreds or thousands of processors, an illustrative example shows only four processors 303A in a server 301A, for simplicity. For instance, a server may have four processors 305a-d running at different workloads. An administrator may determine that if all of the processors are not running at least at 75% utilization or higher, then at least one may be taken off line and its processes performed by the remaining 3 processors. The likelihood is that if there is a spike of greater than 75% that the remaining processors can handle it for a short time. In this example, processor 305a is running at 25%, processor 305b is running at 45%, processor 305c is running at 40% and processor 305d is running at 35%. Using a processor threshold of 75%, one processor may be taken off-line and the remaining three processors 307a-c take over and ultimately run at 45%, 50%, and 50%, respectively, to handle the same overall processing load. Processor 307d becomes idle and may be switched to sleep mode. For a 3.2 GHz processor at 75 amps, as shown in FIG. 2, sleeping the processor reduces power consumption from 131.25 watts to 56 watts.

In a further iteration, it may be possible to redistribute the tasks performed by three processors (307a-c) to two processors (not shown) running at 71% and 74%. In this case, an additional processor may be put into sleep mode, saving another 75 watts. This results in a total savings of 150 watts and two processors both still operating below a selected threshold of 75%.

In an embodiment, processors in the platform may vary in speed and capacity. In most cases, a platform will operate at its lowest common denominator, i.e., either all processors are identical or operate at the lowest available specification level. In this example, the off-load calculation is less complex because each processor in a socket operates at the same level. In one example, a 7-foot tall and 5-foot wide blade server rack may be populated by 72 multi-processor blade servers. The blade servers of today are similar to add-in cards, and existing systems may have a very high density of processors.

In one embodiment a workload profiler is used to determine whether a platform workload may be adjusted. A workload profiler may be an out of band task that determines the status of each processor, where out of band typically implies that the task executes on a remote processor and may communicate with the target processor via a baseboard management controller or other on board processor. There may also be built in logic that identifies if the processors have been running at peak performance for a certain threshold of time and may reduce their speed (and subsequently wattage required) for a set time in order to reduce the heat impact of the peak usage.

Tasks may be offloaded to another processor to put one (or more) processors into sleep mode. Processors may handle throttling, i.e., changing their processing speed on the fly. This feature is desirable to accommodate a heat sink failure. In an embodiment of the invention, processor speed may be throttled to reduce power and heat dissipation requirements.

Figure 4:
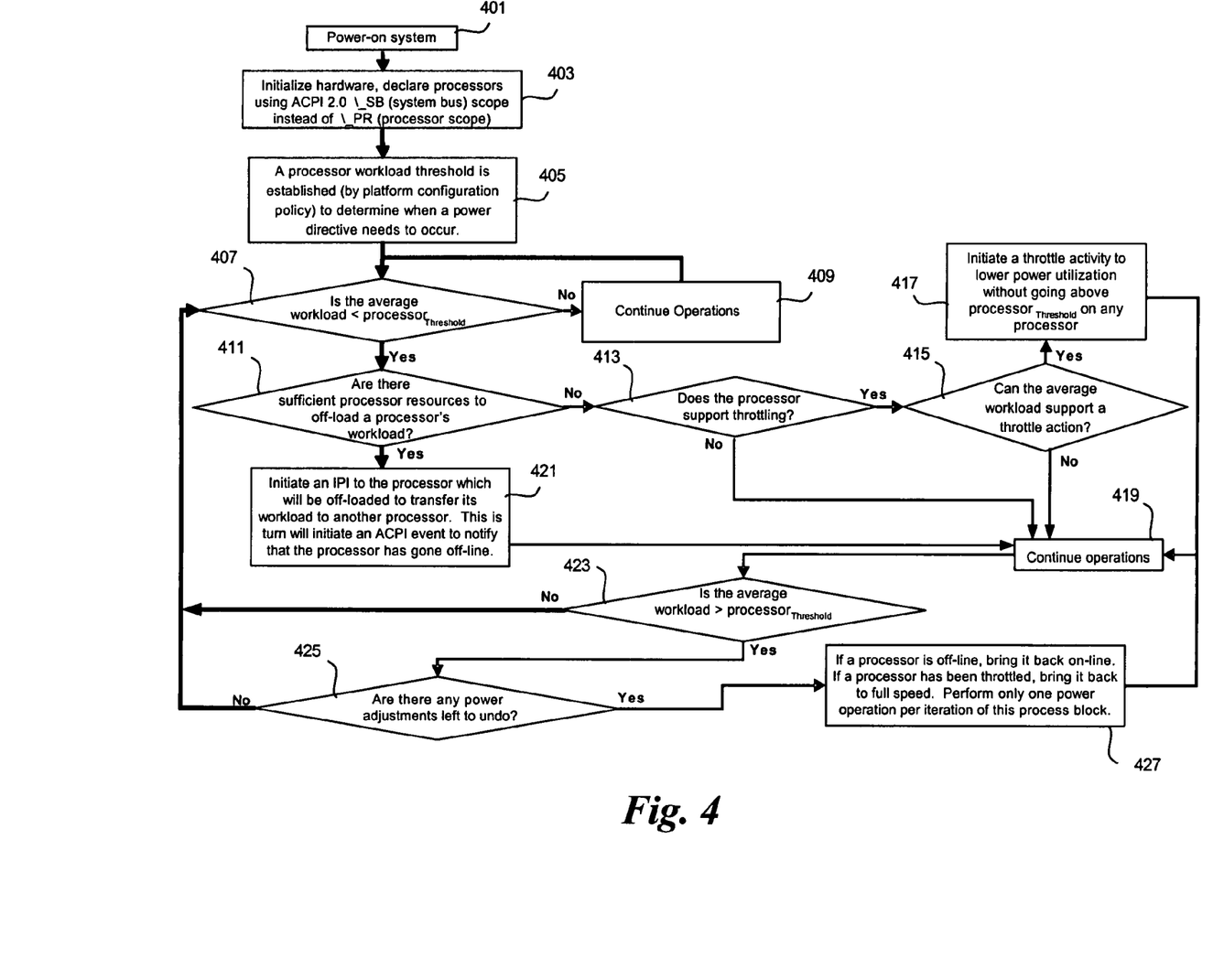
FIG. 4 is a flow diagram of an exemplary process for redistributing computing loads among processors to save power, according to an embodiment of the invention.

Referring now to FIG. 4, there is shown a flow chart for an exemplary method for redistributing computing among processors to save power. When the platform is powered on, in block 401, the power-on self test (POST) and initialization tasks are performed.

The hardware may be initialized in block 403. For instance, the processors may be declared using the Advanced Configuration and Power Interface (ACPI) version 2.0, which may be found at http://www.acpi.info. ACPI is the standard most computer systems currently use for power management and is used to describe how the system looks to the operating system. The firmware may enumerate the system and describe the system components, etc. To support ACPI compliant hot plug events, \_SB topology may be used to describe the system. This topology describes components as being on the system bus.

A processor workload threshold is established by a platform configuration policy to determine when a power directive need occur, in block 405. In one implementation of an embodiment, 75% might be desirable as a processor threshold for one platform, but 25% might be more preferred for another. The thresholds may be processor specific, and not identical throughout the platform. The processor threshold(s) depend on the preferred utilization of a platform. The processor threshold defines when a power event should occur.

Once the thresholds have been set and the platform is operational, the platform may be monitored to determine whether a power event is warranted. It is determined whether the average workload is less than the threshold, in block 407. If not, then operations are operating as best they can with all processors, based on the preferred thresholds. It will be apparent to one of ordinary skill in the art that the best operating workload is subjective based on the available processor capacity, as well as available air conditioning, power usage requirements, and other environmental criteria. The process continues at block 409 and continues operation until the next check is to take place. The periodicity for checking the thresholds may be settable to a preferred frequency.

If the average workload is less than the threshold, then it is determined whether there are sufficient processor resources to off-load the workload of a processor, in block 411. If there are insufficient processor resources to off-load the workload of a processor, then it is determined whether the processor supports throttling, in block 413. One should note that if one processor is throttled down, for instance to 2 GHz from 3.2 GHz, all processors in the system will typically need to be throttled down. This is often only desirable when environmental conditions warrant, i.e., due to an air conditioning overload, etc.

If the processor supports throttling, then it is determined whether the average workload can support a throttling action, in block 415. If so, then a throttle activity may be initiated in block 417 to lower power utilization without going above the processor utilization threshold on any processor. Thus, even though no processors have been put into sleep mode, power consumption may still reduced because the processors may be throttled down. The process continues at 419.

If there are sufficient resources to offload a processor's workload, as determined in block 411, then an interprocessor interrupt (IPI) may be initiated to the processor which will be off-loaded to transfer its workload to another processor, in block 421. This is in turn may initiate an ACPI event to notify that the processor has gone off-line. The IPI is a means by which one processor may communicate with another processor. This communication may initiate an ACPI event and notify the other processors that one has gone offline. When a processor on a computing platform goes offline, the processor's tasks are transferred to other processors. An operating system (OS) may have support built in for handling this type of event. Once the transfer of processes is complete, then the processor may be put into sleep mode. Operations then continue normally with block 419 and the platform continues to monitor the processor utilization threshold.

A determination is made as to whether the average workload is greater than the processor threshold in block 423. If so, then it is determined whether any power adjustments are left to undo in block 425. If so, then if a processor is off-line (e.g., in sleep mode) then the processor may be brought back online to take on tasks from other, overloaded, processors in block 427. If a processor has been throttled, it may be brought back to full speed. Only one power operation per iteration is typically performed at a time in block 427. A preference for reversing throttling and sleep events may be user selectable and be set up as part of the workload profiler.

When the average workload is not greater than the processor threshold then operations continue at block 407 and wait for the next threshold probe to determine if a processor may be taken off line or throttled down. One should note that as described, when the workload is equal to the processor threshold that all corrective action is skipped. It will be apparent to one of ordinary skill in the art how to change the operations described herein to either perform corrective action or not, based on a comparison check that identifies an equality rather than a "less than" or "greater than." This modification may be user selectable and set in the workload profiler.

It will be apparent to one of ordinary skill in the art that embodiments of the present invention may be practiced by altering the order of the elements in the flow diagram and/or by omitting certain actions. For instance, some implementations of an embodiment have processors that cannot be throttled. In this case, only offloading of workload from one processor to another may be performed. It will also be apparent to one of ordinary skill in the art that a variety of workload algorithms may be used to determine to which processors to offload the workload, and how much workload should be offloaded.

In an embodiment, each processor has processor-specific thresholds to define minimum, maximum and optimum efficiencies. The platform may define optimum thresholds and severe condition thresholds. Some systems may define a maximum period at which the system is permitted to operate above a threshold power consumption. For instance, the air conditioning system may be able to accommodate 90% utilization of all processors for 10 hours. In this case, it may be desirable to throttle down the processor speed after 10 hours of 90% operation. This may cause user delay time, but may save the platform and air conditioning systems from catastrophic failure. It will be apparent to one of ordinary skill in the art that the idiosyncrasies of the power constraints and requirements of an enterprise may be captured in the parameters and thresholds of the workload profiler.

In some extreme cases, the threshold may be set at 99%. In this case, active processors may operate at almost full capacity, but the number of processors in sleep mode is maximized. There is a trade-off for power versus efficiency. In some embodiments, the threshold for throttling may be different than the threshold for off-loading.

Figure 5:
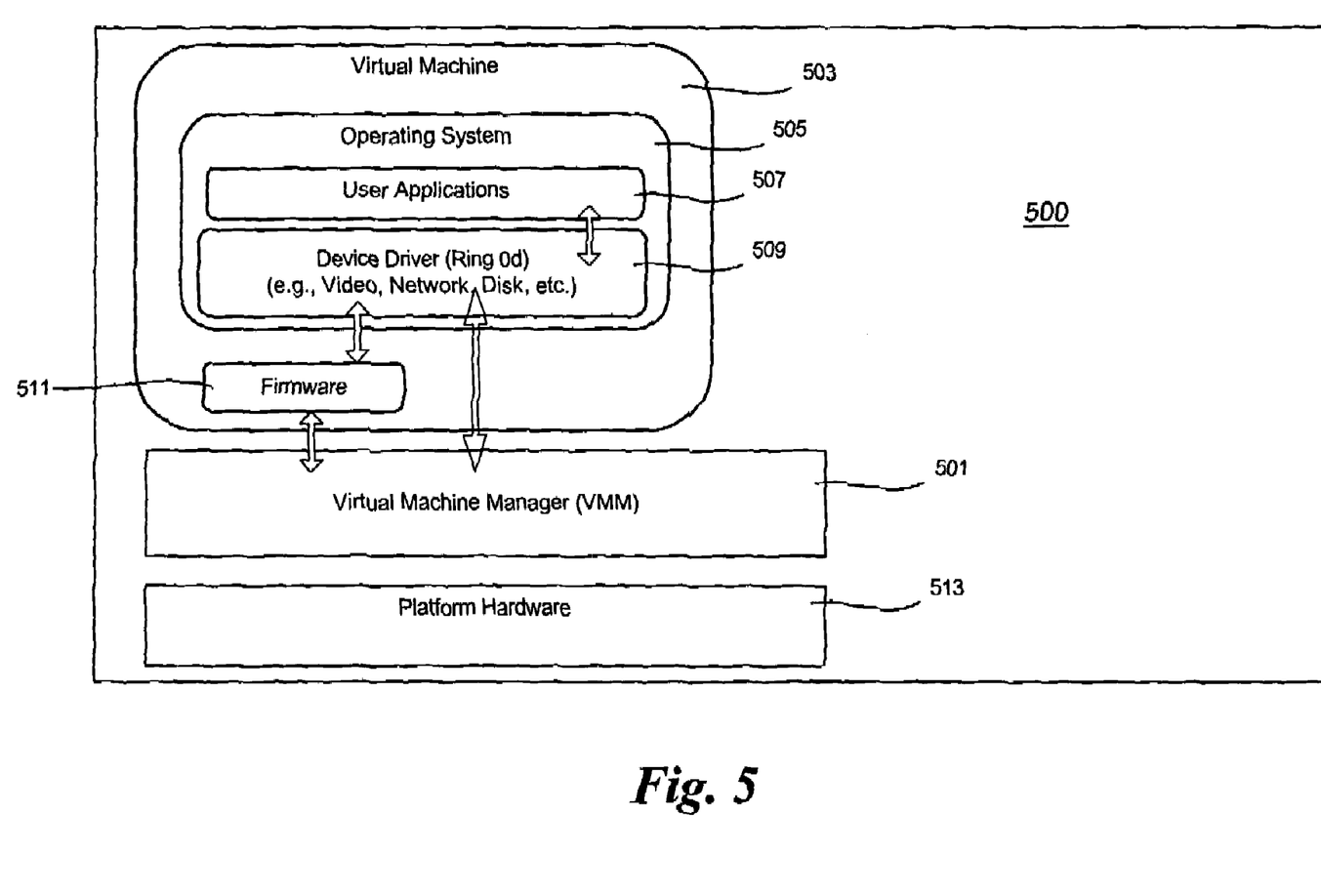
FIG. 5 is a block diagram of an exemplary virtual machine environment in which an embodiment of the invention resides.

Now referring to FIG. 5, there is shown a block diagram of an exemplary virtual machine environment 500 in which an embodiment of the invention resides. A Virtual Machine Manager (VMM) 501 monitors and controls the platform environment 500. Each processor may operate a separate virtual machine 503 having its own operating system (OS) 505, user applications 507, device drivers 509 and firmware component, i.e., BIOS, etc. 511. The virtual machine environment 500 has platform hardware 513 that may include many blade server processors. The VMM 501 may act effectively as a workload profiler for the platform. An embodiment using a VMM as the workload profiler may be efficient due to some of the recent technology advances in virtualization technology. Platforms that do not have hardware enabled virtualization may perform these task using software or firmware methods.

In order to perform the method as discussed in conjunction with FIG. 4, a VMM 501 may monitor the platform unobtrusively. A virtual machine (VM) 503 may have all of the usual devices and device drivers 509, etc. In one implementation of an embodiment, a user may have a device sitting on a coffee table or attached to a wide screen television that acts as a web browser, a broadcast television programming time shifter (i.e., an on-demand digital video recorder (DVR) such as a TiVo® service) and a DVD player. The device may be a desktop PC or a derivation of this type of device. Each different function may operate in a different VM 503 running actively on the device. The platform hardware 513 assists and parses out resources of the device to all of the VMs 503. For instance, while one is web browsing, the DVR may be recording content received over a broadcast or cable channel. While web browsing, a display may be shown in a split screen mode and one screen may display a DVD recording with the other displaying the web browsing session. Each function may be accomplished independently of the other functions, on the same machine, simultaneously. Each function is effectively isolated in its own VM 503. The VMM 501 acts a proxy for resource access. In an embodiment, the VMM 501 may send an alert to a VM 503. In an embodiment, the VMM 501 may communicate with a processor having a VM directly. The VMM 501 may cause a processor to sleep. The VMM 501 may perform workload profiling, for instance as described in conjunction with FIG. 4, to see how busy a processor is currently. The VMM 501 may keep the platform policy.

In another embodiment, the profiler may be part of the platform. The profiler may have its own setup options. The system is a tunable environment. For instance, the periodicity of workload sampling and threshold selections are settable.

In another embodiment, workload profiling is performed in a non-virtualization environment, or without a VMM. In a non-virtualization environment, kernel drivers may be used to effect the same type of probing and migration of data. A kernel driver implementation may require an OS specific-driver to implement, as well as, the firmware declaring the processors as a particular system bus device instead of a processor type device.

The techniques described herein are not limited to any particular hardware or software configuration; they may find applicability in any computing, consumer electronics, or processing environment. The techniques may be implemented in hardware, software, or a combination of the two. The techniques may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, that may include multiple processors, at least one storage medium readable by the processors (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various system configurations, including multiprocessor systems, minicomputers, mainframe computers, independent consumer electronics devices, blade servers rack systems and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by the machine and that cause the machine to perform any one of the methods described herein. The term "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A system for reducing power consumption in a multi-processor environment, comprising:
    a plurality of processors being interchangeable with respect to execution of enterprise tasks, wherein at least one processor is capable of sleep mode, and wherein a processor in sleep mode uses less power than a processor not in sleep mode;
    a workload profiler to monitor workloads on the respective plurality of processors, and to determine whether each workload exceeds a predetermined threshold, the workloads comprising a plurality of enterprise tasks, and the workload profiler to redistribute enterprise tasks among the plurality of processors by initiating a power event,
    wherein the workload profiler is configured to initiate sleep mode in one or more processors in conjunction with the redistribution of enterprise tasks among the plurality of processors, when the predetermined threshold exceeds one or more workloads, and
    wherein the workload profiler is configured to initiate wake mode in one or more sleeping processors in conjunction with the redistribution of enterprise tasks among the plurality of processors, when one or more workloads exceeds the predetermined threshold, and
    wherein the redistribution is to initiate an interprocessor interrupt, transfer workload from a first processor to a second processor of the plurality of processors, and notify the plurality of processors of the power event, and
    wherein the workload profiler is bundled with a virtual machine manager (VMM) in a virtualization environment.

2. The system as recited in claim 1, wherein each processor operates in a separate virtual machine (VM).

3. The system as recited in claim 1, wherein the workload profiler comprises an operating system (OS) agent.

4. The system as recited in claim 1, wherein the workload profiler is an out of band process.

5. A system for reducing power consumption in a multi-processor environment, comprising:
    a plurality of processors being interchangeable with respect to execution of enterprise tasks, wherein at least one processor is capable of sleep mode, and wherein a processor in sleep mode uses less power than a processor not in sleep mode;
    a workload profiler to monitor workloads on the respective plurality of processors, and to determine whether each workload exceeds a first and/or second predetermined threshold, the workloads comprising a plurality of enterprise tasks, and the workload profiler to redistribute enterprise tasks among the plurality of processors by initiating at least one power event,
    wherein the workload profiler is configured to initiate a throttling of processor speed in one or more processors in conjunction with the redistribution of enterprise tasks among the plurality of processors based on the first and second predetermined thresholds and determined workloads, and
    wherein the workload profiler is configured to initiate sleep mode in one or more processors in conjunction with the redistribution of enterprise tasks among the plurality of processors, when the first predetermined threshold exceeds one or more workloads, and
    wherein the workload profiler is configured to initiate wake mode in one or more sleeping processors in conjunction with the redistribution of enterprise tasks among the plurality of processors, when one or more workloads exceeds the first predetermined threshold.

6. The system as recited in claim 5, wherein the workload profiler is bundled with a virtual machine manager (VMM) in a virtualization environment.

7. The system as recited in claim 5, wherein the workload profiler is an out of band process.

8. The system as recited in claim 5, wherein the first and second predetermined thresholds are processor-specific.

9. A method for reducing power consumption in a multi-processor environment, comprising:
    periodically probing a plurality of processors, by a workload profiler, to determine a workload for each processor, the periodicity of the probing being user selectable;
    determining whether a user selectable first threshold exceeds one or more workloads;
    if the user selectable first threshold exceeds one or more workloads, then redistributing workloads among the plurality of processors, and initiating a sleep state in one or more idle processors;
    if the one or more workloads exceeds the user selectable first threshold, then waking one or more processors from a sleep state, and redistributing workloads among the plurality of processors; and
    determining whether a user selectable second threshold has been exceeded and throttling processor speed for one or more processors based on the user selectable first and second threshold and determined workloads,
    wherein the workload profiler is bundled with a virtual machine manager (VMM), the VMM controlling the plurality of processors in a virtualization environment.

10. The method as recited in claim 9, wherein the first threshold is different from the second threshold.

11. The method as recited in claim 9, wherein each processor operates in a separate virtual machine (VM).

12. The method as recited by claim 9, wherein the workload profiler is an out of band process.

13. The method as recited in claim 9, wherein the workload profiler comprises an operating system (OS) agent.

14. A method for reducing power consumption in a multi-processor environment, comprising:
    periodically probing a plurality of processors, by a workload profiler, to determine a workload for each processor, the periodicity of the probing being user selectable;
    determining whether a user selectable first threshold exceeds one or more workloads;

if the user selectable first threshold exceeds one or more workloads, then redistributing workloads among the plurality of processors, and initiating a sleep state in one or more idle processors;

if the one or more workloads exceeds the user selectable first threshold, then waking one or more processors from a sleep state, and redistributing workloads among the plurality of processors; and determining whether a user selectable second threshold has been exceeded and throttling processor speed for one or more processors based on the user selectable first and second threshold and determined workloads, wherein the first threshold is different from the second threshold, and wherein the first and second thresholds are processor-specific.

15. The method as recited in claim 14, wherein the workload profiler is bundled with a virtual machine manager (VMM), the VMM controlling the plurality of processors in a virtualization environment.

16. A method for reducing power consumption in a multi-processor environment, comprising:

periodically probing a plurality of processors, by a workload profiler, to determine a workload for each processor, the periodicity of the probing being user selectable;

determining whether a user selectable first threshold exceeds one or more workloads;

if the user selectable first threshold exceeds one or more workloads, then redistributing workloads among the plurality of processors, and initiating a sleep state in one or more idle processors; and if the one or more workloads exceeds the user selectable first threshold, then waking one or more processors from a sleep state, and redistributing workloads among the plurality of processors, wherein the workload profiler is bundled with a virtual machine manager (VMM), the VMM controlling the plurality of processors in a virtualization environment, and wherein redistributing workloads further comprises:

initiating an interprocessor interrupt;

transferring workload from a first processor to a second processor; and notifying the plurality of processors that the first processor has gone off-line.

17. The method as recited in claim 16, wherein the workload profiler comprises an operating system (OS) agent.

18. The method as recited in claim 16, wherein each processor operates in a separate virtual machine.

19. The method as recited in claim 16, wherein the workload profiler is an out of band process.

20. A machine accessible storage medium containing code stored therein for managing power consumption in a multi-processor platform, that when executed on a machine cause the machine to:

periodically probe a plurality of processors, by a workload profiler, to determine a workload for each processor, the periodicity of the probing being user selectable;

determine whether a user selectable first threshold exceeds one or more workloads;

if the user selectable first threshold exceeds one or more workloads, then redistribute workloads among the plurality of processors, and initiate a sleep state in one or more idle processors;

if the one or more workloads exceeds the user selectable first threshold, then wake one or more processors from a sleep state, and redistribute workloads among the plurality of processors; and determine whether a user selectable second threshold has been exceeded and throttling processor speed for one or more processors based on the user selectable first and second threshold and determined workloads, wherein the workload profiler is bundled with a virtual machine manager (VMM), the VMM controlling the plurality of processors in a virtualization environment.

21. The machine accessible storage medium as recited in claim 20, wherein the first threshold is different from the second threshold.

22. The machine accessible storage medium as recited in claim 20, wherein each processor operates in a separate virtual machine (VM).

23. The machine accessible storage medium as recited in claim 20, wherein the workload profiler is an out of band process.

24. The machine accessible storage medium as recited in claim 20, wherein the workload profiler is an operating system (OS) agent.

25. A machine accessible storage medium containing code stored therein for managing power consumption in a multi-processor platform, that when executed on a machine cause the machine to:

periodically probe a plurality of processors, by a workload profiler, to determine a workload for each processor, the periodicity of the probing being user selectable;

determine whether a user selectable first threshold exceeds one or more workloads;

if the user selectable first threshold exceeds one or more workloads, then redistribute workloads among the plurality of processors, and initiate a sleep state in one or more idle processors;

if the one or more workloads exceeds the user selectable first threshold, then wake one or more processors from a sleep state, and redistribute workloads among the plurality of processors; and determine whether a user selectable second threshold has been exceeded and throttling processor speed for one or more processors based on the user selectable first and second threshold and determined workloads, wherein the first threshold is different from the second threshold, and wherein the first and second thresholds are processor-specific.

26. The machine accessible storage medium as recited in claim 25, wherein the workload profiler is bundled with a virtual machine manager (VMM), the VMM controlling the plurality of processors in a virtualization environment.

27. A machine accessible storage medium containing code stored therein for managing power consumption in a multi-processor platform, that when executed on a machine cause the machine to:

periodically probe a plurality of processors, by a workload profiler, to determine a workload for each processor, the periodicity of the probing being user selectable;

determine whether a user selectable first threshold exceeds one or more workloads;

if the user selectable first threshold exceeds one or more workloads, then redistribute workloads among the plurality of processors, and initiate a sleep state in one or more idle processors; and if the one or more workloads exceeds the user selectable first threshold, then wake one or more processors from a sleep state, and redistribute workloads among the plurality of processors, wherein the workload profiler is bundled with a virtual machine manager (VMM), the VMM controlling the plurality of processors in a virtualization environment, and wherein redistributing workloads further code that causes the machine to:

initiate a interprocessor interrupt;

transfer workload from a first processor to a second processor;

notify the plurality of processors that the first processor has gone off-line.

28. The machine accessible storage medium as recited in claim 27, wherein the workload profiler comprises an operating system (OS) agent.

29. The machine accessible storage medium as recited in claim 27, wherein the workload profiler is an out of band process.

* * * * *